United States Patent [19]

Legrain

[11] 4,291,647

[45] Sep. 29, 1981

[54] DEVICE FOR DISTRIBUTING LIQUID IN GIVEN DOSES FOR A MACHINE FEEDING AS DESIRED YOUNG SUCKLING MAMMALS

[76] Inventor: Michel A. J. Legrain, Foulbec, 27210 Beuzeville, France

[21] Appl. No.: 129,770

[22] Filed: Mar. 12, 1980

[30] Foreign Application Priority Data

Mar. 14, 1979 [FR] France ................ 79 06463

[51] Int. Cl.³ ............................ A01K 5/00; A01K 9/00
[52] U.S. Cl. ................................. 119/51.11; 119/71
[58] Field of Search ............... 119/51.11, 51.5, 71; 137/132, 133, 134, 135

[56] References Cited

U.S. PATENT DOCUMENTS

| 3,425,398 | 2/1969 | Buffy et al. | 119/51.11 |
| 3,625,183 | 12/1971 | Tartar | 119/51.11 |
| 3,720,185 | 3/1973 | Aldous et al. | 119/51.11 |
| 4,181,097 | 1/1980 | Betsuno | 119/51.11 |

Primary Examiner—Hugh R. Chamblee
Attorney, Agent, or Firm—Sughrue, Rothwell, Mion, Zinn and Macpeak

[57] ABSTRACT

The device comprises a syphon which connects a reservoir to a collecting recipient. The reservoir is supplied with liquid through a valve. A tube extends the reservoir upwardly and carries a detector which checks the level situated just above the syphon. A second detector is placed at the outlet of the syphon. The two detectors are electrically connected to the control of the valve so as to close the valve when the liquid reaches the detector checking the level and to preclude the opening of the valve so long as the detector receives liquid issuing from the syphon. The amount of liquid poured upon each opening of the valve is thus always strictly the same.

Application to the preparation of mixtures having a precise and adjustable concentration, such as a mixture of powdered milk and water.

12 Claims, 6 Drawing Figures

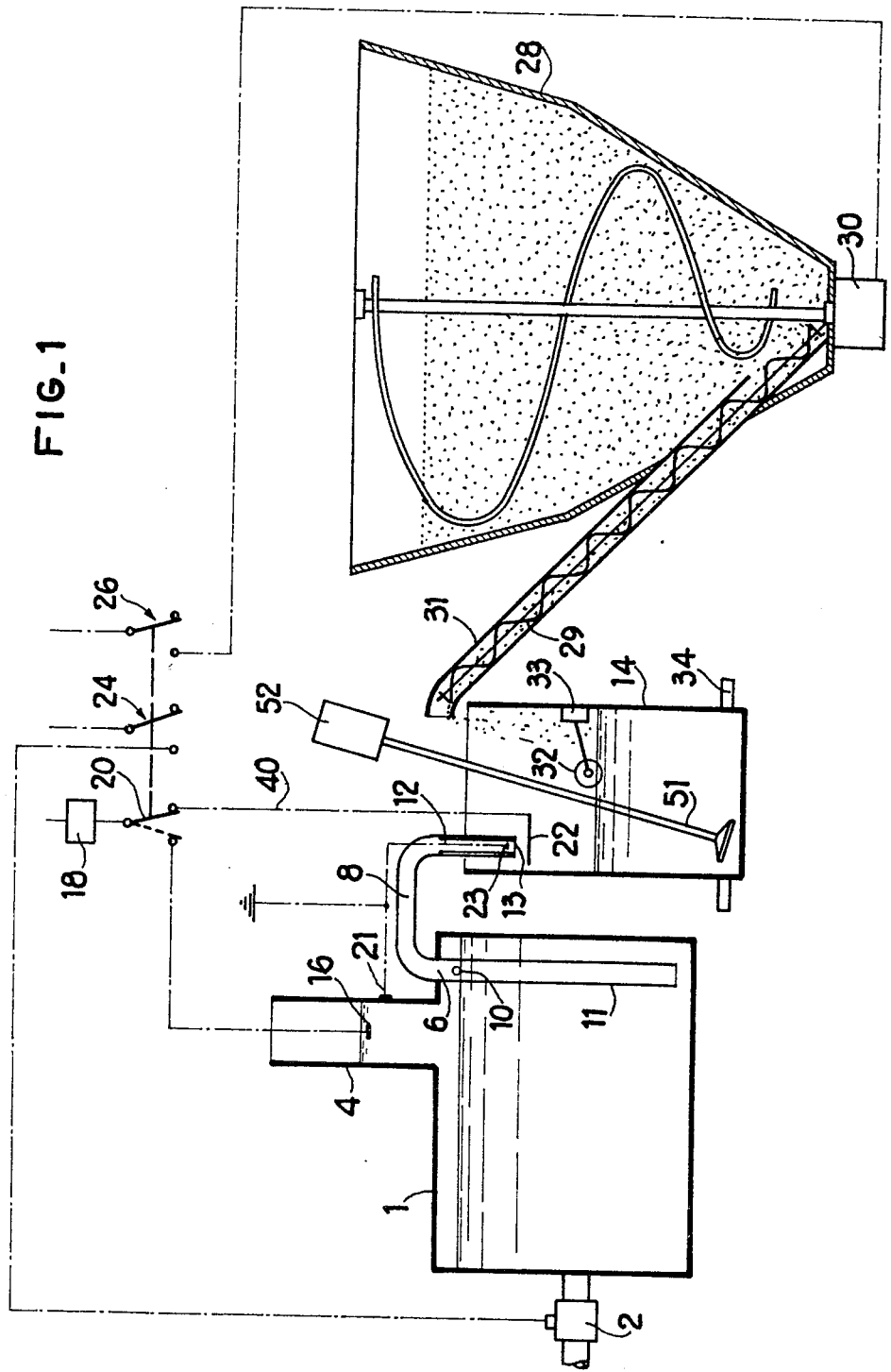
FIG_1

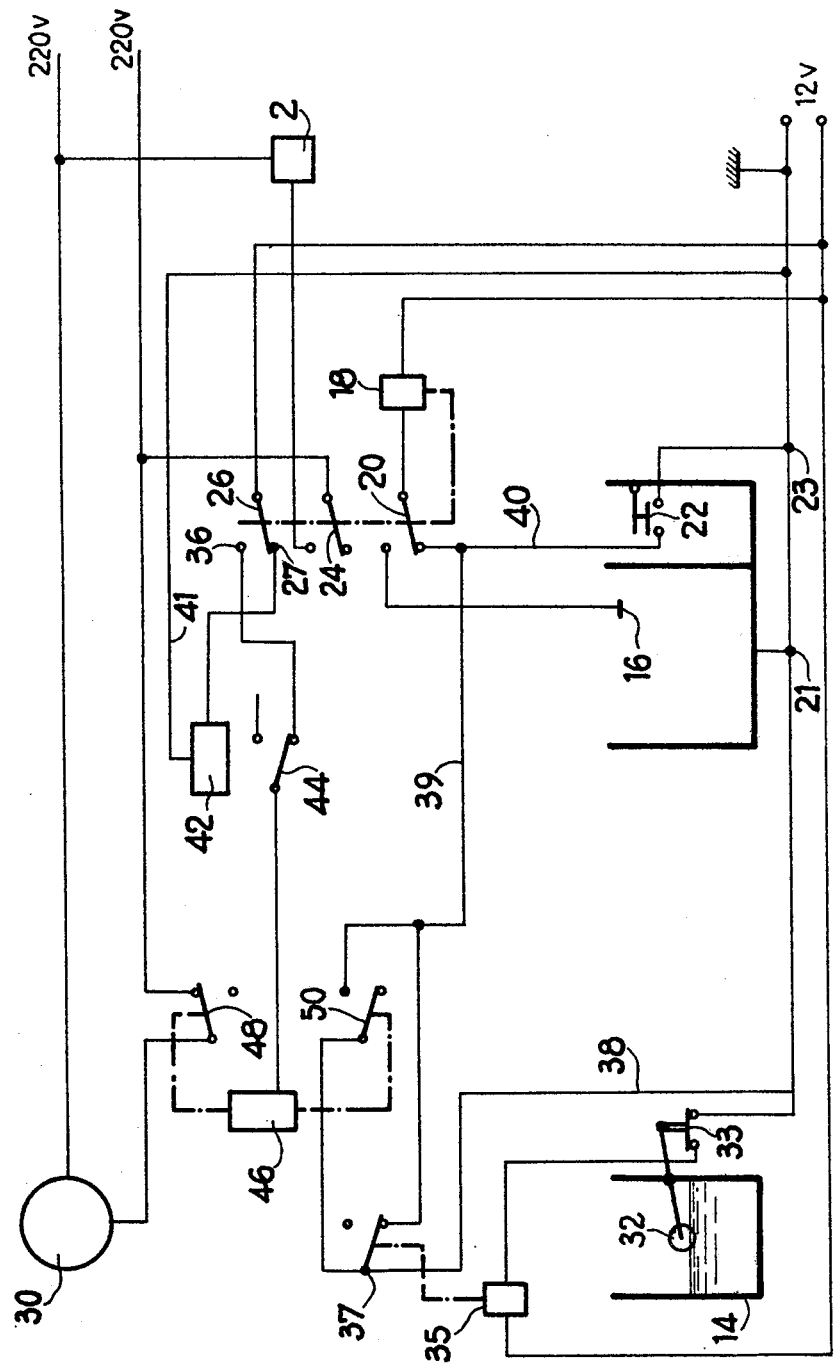
FIG._2

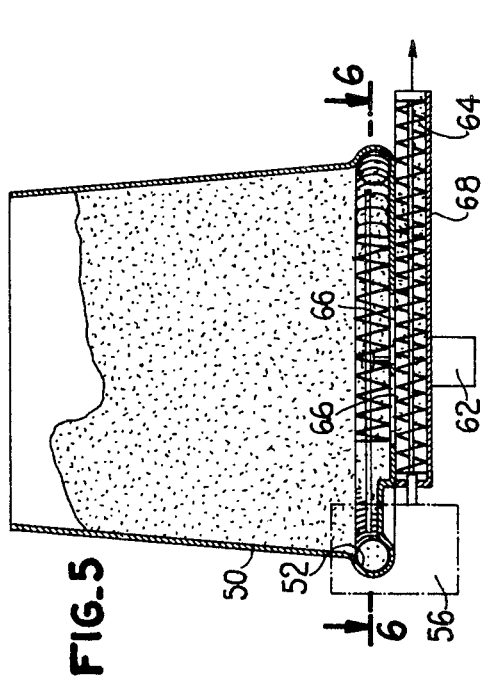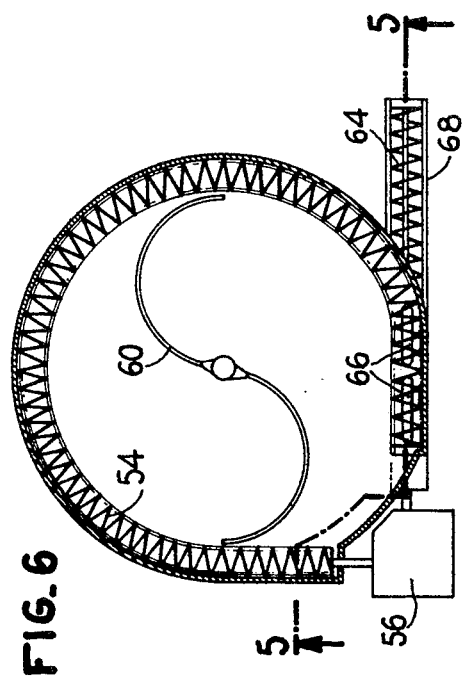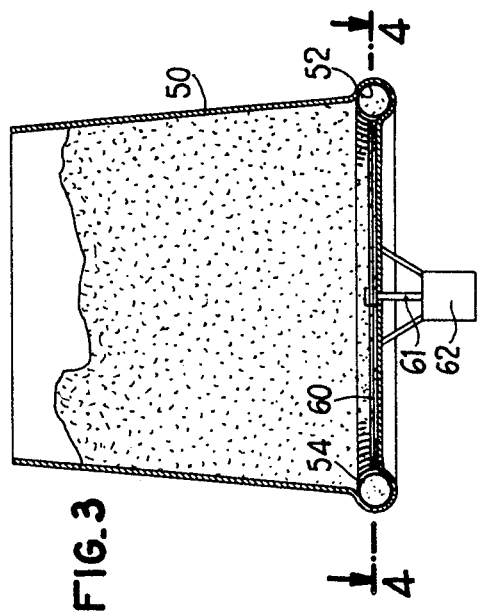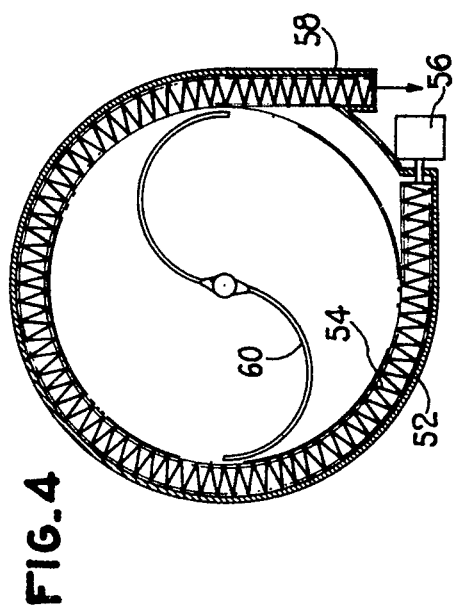

DEVICE FOR DISTRIBUTING LIQUID IN GIVEN DOSES FOR A MACHINE FEEDING AS DESIRED YOUNG SUCKLING MAMMALS

DESCRIPTION

The present invention relates to a device for distributing liquid in given doses which is more particularly adapted for the preparation of liquid or pasty mixtures having a precise concentration and intended for feeding young suckling mammals.

This device comprises a reservoir connected through a valve to a source of liquid and upwardly extended by a calibrated tube provided with means for checking the level of the liquid it contains; a syphon whose small branch extends into the reservoir and whose large branch extends into a collecting recipient; and means for detecting the liquid flow at the outlet of the syphon. The means detecting the flow of the liquid and the means checking the level of the liquid in the tube are connected to the supply valve of the reservoir so as to open this valve when, in the absence of flow in the syphon, the level in the tube is lower than the set level.

The dimension of the calibrated tube and the position of the means for checking the level within the tube are so chosen that the liquid reaches these checking means at the moment when the syphon is primed. Thus the amount of liquid poured from the syphon is known in a precise manner and the valve can only feed the liquid to the reservoir when the flow in the collecting recipient has stopped.

Such a device is particularly well adapted for forming mixtures whose concentration must be precise but may vary in accordance with use. Consequently, the scope of the invention encompasses a machine for feeding young mammals which comprises such a device and in which the valve feeding the reservoir is also connected to a device feeding powdered milk and opens only when this second feed device has fed the desired amount to the collecting recipient. In such a case, the mere regulation of the operation of this second device ensures a precise concentration of the mixture.

The advantages and features of the invention will be apparent from the ensuing description of one embodiment which is given merely by way of example and shown in the accompanying drawings.

In the drawings:

FIG. 1 is a diagrammatic view of a machine comprising a device according to the invention;

FIG. 2 is an electric diagram of the control of the machine of FIG. 1, the circuit carrying current;

FIG. 3 is a vertical sectional view of a modification of the device feeding powder to the machine of FIG. 1;

FIG. 4 is a sectional view taken on line 2—2 of FIG. 3;

FIGS. 5 and 6 are views similar to FIGS. 3 and 4 of a modification.

The distributing device according to the invention comprises a reservoir 1 for the liquid to be distributed and connected through a valve 2 to a source (not shown) which may be for example the water mains supply. this reservoir 1 is extended by a calibrated tube 4 which extends upwardly from its upper wall. The short branch 6 of a syphon 8 extends slightly into the reservoir 1 into which it opens by way of an orifice 10. The long branch 12 of this syphon, whose diameter is less than that of the branch 6, extends into a collecting recipient 14.

A level checking means, formed in the illustrated embodiment by a detector 16, is mounted in the tube 4 and electrically connected, for example through a relay 18 and a switch 20, to the control 24 of the valve 2 controlling the supply of liquid to the reservoir 1, the tube 4 being earthed at 21. The relay 18 and the switch 20 are connected in such manner that when the water, or other liquid, is present in the tube 4 and reaches the detector 16, the valve 2 is closed.

It will be understood that the position of the detector 16 controlling the level is so chosen as to permit the priming of the syphon 8. Consequently, this detector 16 is located at a height greater than that of the horizontal branch of the sypon 8. Preferably, the detector 16 is placed as close as possible to the priming point so that the valve 2 is closed as soon as this priming has occurred. It will be understood that in this case, the amount of liquid poured from the syphon into the collecting recipient 14 corresponds to the volume defined in tube 4 and the reservoir 1, between the detector 16 and the lower orifice of the branch 6 of the syphon 8, to which there is added the volume of the syphon. This volume may easily correspond to a well determined amount of liquid. Further, if desired, it may be regulated by a displacement of the orifice 10 in the reservoir, the flow through the valve being always greater than that of the syphon 8.

The pouring of the liquid into the collecting recipient 14 is moreover controlled by means 22 responsive to the flow of the liquid and mounted in the recipient 14 below the lower orifice 13 of the branch 12 of the syphon. Preferably, a terminal 23 connected to earth is mounted in the vicinity of this orifice 13 on the branch 12 of the syphon and the means responsive to the flow of the liquid is formed by a plate which is electrically connected through the switch 20 to the relay 18 controlling the switch 24 of the valve 2, this relay maintaining the valve closed so long as it is exited. When the level of the liquid in the reservoir is at the level of the orifice 10, if the switch 20 is shifted to the position in dot-dash line in FIG. 1, the relay is no longer excited and the valve 2 is open. The reservoir is filled. As soon as the liquid which rises in the tube 4 reaches the detector 16, it excites the relay and actuates the switch 24 and the switch 20 so that the excitation of the relay and the closure of the valve are maintained until the liquid ceases to flow from the syphon. As soon as the liquid has been completely poured into the collecting recipient 14, the valve is once again opened and the cycle recommences.

The doses poured each time into the recipient 14 are exactly the same irrespective of the frequency and number of cycles employed.

Such a device is particularly adapted for the preparation of mixtures in which the concentration must be precise and be capable of being exactly repeated. FIG. 1 of the accompanying drawing gives diagrammatically one embodiment of a machine for feeding young suckling mammals and comprising, on one hand, water and, on the other hand, powdered milk or the like.

The powder is placed in a reservoir 28 having for example the shape of a hopper and it is conveyed to the collecting recipient 14 by means of a suitable feed system, for example constituted by a spiral conveyor 29 placed in a spout 31 and communicating in the upper part with the collecting recipient 14. The spiral conveyor 29 is driven by a motor 30 which is preferably an electric motor and is associated with means for regulating the number of rotations to be effected per cycle. This motor 30 is connected to the control of the valve 2. The motor 30 and the valve 2 are preferably connected to the same electric circuit or to two associated circuits so as to cause for example the simultaneous opening of the valve 2 and the starting up of the motor 30 but to preclude a second opening of the valve 2 so long as the cycle of the motor 30 has not finished.

In a preferred embodiment, such as that illustrated, the collecting recipient 14 is provided with a level checking system diagrammatically represented in FIG. 1 by a float 32. This float 32 is electrically connected both to the valve 2 and to the motor 30 driving the sprial conveyor 20 and it simultaneously actuates them when the liquid contained in this recipient drops below a given level. The valve 2 is closed as soon as a dose of liquid has been poured into the recipient 14, but so long as the spiral conveyor has not finished its cycle, this valve 2 cannot once more open. On the other hand, as soon as the motor 30 stops the conveyor 29, it releases the control of the valve 2 and allows the opening thereof. Thereafter, as soon as the float 32 signals a drop in the level of the mixture, a fresh dose of liquid may be poured into the collecting recipient.

Indeed, as shown diagrammatically in FIG. 2, the float 32 is for example electrically connected to an electric switch 33 which it closes when the mixture reaches the set level, which excites a relay 35 which controls a switch 37 connected by conductors 38 and 39 respectively to earth and to the conductor 40 which connects the switch 20 to the plate 22. When the relay 35 is excited, the switch 37 is closed and connected to the relay 18 by the switch 20. This relay 18 is excited and maintains the switches 24 and 26, respectively controlling the opening of the valve 2 and the starting up of the motor 30, in the illustrated position of rest.

As soon as the level of the liquid drops in the recipient 14, the relay 35 ceases to be excited and allows the switch 37 to open. The relay 18 is not excited. The switches 20, 24 and 26 swing over. The switch 26 leaves the contact 27 which is connected through a conductor 41 to a timing relay 42 which ensures a delay in the de-excitation thereof and controls a switch 44 interposed between the second contact 36 of the switch 26 and a regulating relay 46 which controls a switch 48 closing the supply circuit of the motor 30. The relay 42 opens the switch 44 with a slight delay relative to the actuation of the switch 26 and the relay 46 maintains the switch 48 closed for the period required for pouring the desired amount of powder.

The relay 46 also closes a switch 50 which is connected in parallel with the switch 37 between the conductors 38 and 39.

When the liquid arriving through the valve 2 reaches the detector 16, the circuit exciting the relay 18 is closed between this detector and the terminal 21. The switch 20 swings to the conductors, the plate 22 and the terminal 23 and maintains the relay 18 excited so long as the liquid issues from the syphon and drops into the collecting recipient.

The switch 24 has swung over. The valve is closed. The switch 26 has also swung over, but the control 46 continues its cycle to the end. The switch 50 is maintained closed. Consequently, even if the level of the liquid in the collecting recipient is lower than that of the contact or detector 33, the valve 2 does not open. The relay 18 remains excited so long as the control 46 operates. As soon as the control 46 stops, the switches 48 and 50 open and the cycle can recommence as soon as the contact or the detector 33 initiates it.

The rotational speed of the spiral conveyor 29 and the number of rotations thereof required for pouring the desired amount of powder, may be easily regulated as a function of the nature of this powder or of the quality of the mixture to be obtained.

By means of the device of the invention, irrespective of the chosen type of cycle for the spiral conveyor, the collecting recipient always receives exactly the desired dose of liquid for corresponding to the dose of powder introduced in the course of one cycle of the spiral conveyor 29. Further, the concentration of the mixture may be easily modified by regulating the number of rotations, i.e. the period of operation of the spiral conveyor, which is a simple and precise type of regulation.

Consequently, a machine provided with a liquid distributing device according to the invention is easily adaptable to extremely diverse types of products and in particular more or less fatty powders employed in succession or alternately with concentrations which may be easily modified. It is consequently possible with the machine arranged in this way to prepare from more or less fatty powders and water, milk for feeding as desired young animals such as calves. The collecting recipient 14 is then for example provided with nozzles 34 for connecting pipes for directly and continuously drawing off the mixture and terminating for example in teats.

It must be understood that such a machine may also comprise other adjustable devices for feeding liquid, pasty, powdered or other products, connected in a similar manner to the control of the valve 2 so as to permit, for example, the introduction into the recipient 14 of a fatty subatance at the same time as the powdered milk and water.

Further, a stirrer 51 mounted in the recipient 14 may be driven by an electric motor 52 which is connected to the circuit controlling the valve 2 and the devices feeding the various ingredients of the mixture.

When the liquid must be heated, the branch 6 of the syphon is preferably extended down to the vicinity of the bottom of the reservoir by a tube 11 whose lower orifice is larger than the orifice 6 so as to enable the hot liquid at the bottom of the reservoir to be drawn off.

In the case where the powdered milk is relatively fatty, it is often preferable to arrange the hopper containing the supply of powder and the driving and metering screw in the form shown in FIGS. 3 to 6.

The hopper 30 then has a downwardly divergent frustoconical shape and defines in its lower part a peripheral annular inner groove 52 in which a flexible driving screw 54 is disposed. This screw 54 is formed for example by a coiled wire which is connected at one end to the shaft of a motor 56 which drives it in rotation about the axis of the helix of the coils.

At the end of the groove remote from the motor 56, the groove 52 is extended by a pouring spout 58. A scraper 60, whose shape is defined by two semi-circular blades carried by a vertical shaft 60, is mounted in the bottom of the hopper 50 in alignment with the groove 52 and is driven in rotation about the axis of the shaft 61 by a motor 62. The rotation of the scraper 60 urges the powder toward the screw 54 and the movement of the latter drives this powder toward the spout 58 and the collecting recipient 14 at a flow or rate determined by the speed of the motor. It will be understood that the starting up and the period of operation of the motors 56 and 62 are controlled in the same way as those of the motor 30 of FIG. 1.

In another modification, the spout 68 for pouring the powder is disposed below the groove 52 of the hopper 50 and is tangent to this groove, and contains a spiral conveyor 64 driven by a motor, which may be the motor 56 driving the screw 54. The bottom of the groove 52 has a series of apertures 66 allowing communication with the spout 64 through which the powder falls into this spout and is driven toward the collecting recipient 14. The powder is consequently distributed in regular known doses which may be adjusted as a function of the desired concentration irrespective of its content of fatty substances.

Having now described my invention what I claim as new and desire to secure by Letters Patent is:

1. A device for distributing a liquid in given doses for the mixture thereof, in a collecting recipient, with at least one other powdered ingredient such as powdered milk, for feeding young suckling mammals, said device comprising a source of liquid, a reservoir, a valve connecting the reservoir to the source, a calibrated tube upwardly extending the reservoir, means for checking the level of the liquid contained in the tube, a syphon having a short branch which extends into the reservoir and a long branch which extends into the collecting recipient, means for detecting the flow of liquid through the syphon and mounted in the collecting recipient and means connecting the liquid flow detecting means and the means checking the level of the liquid in the tube to the valve for opening the valve automatically when, in the absence of flow through the syphon, the liquid in the tube descends to a level lower than a set level.

2. A device as claimed in claim 1, wherein the valve in an electrically controlled valve and an electric circuit is connected to the valve to control the valve, the means for checking the level of the liquid in the tube comprising a detector inserted in the electric circuit, the tube being earthed.

3. A device as claimed in claim 2, wherein the means for detecting the flow of the liquid through the syphon comprise an electric terminal disposed substantially horizontally under an outlet orifice of the long branch of the syphon in the collecting recipient, said terminal being connected to the electric circuit and the end of the syphon being earthed.

4. A device as claimed in claim 2 or 3, wherein the syphon has a horizontal branch interconnecting the short branch and the long branch, and the detector checking the level in the tube is placed at a higher level than the horizontal branch of the syphon.

5. A device as claimed in any one of the claims 1 to 3, wherein the short branch of the syphon is extended down to the bottom of the reservoir and terminates in a second orifice for communication with the reservoir.

6. A device as claimed in any one of the claims 1 to 3, wherein the long branch of the syphon has a smaller diameter than the rest of the syphon.

7. A machine for preparing a misture of a powder and a liquid, which mixture always has precise proportions and is intended for feeding young suckling mammals, said machine allowing the feeding as desired and comprising a collecting recipient; at least one device comprising a source of liquid, a first reservoir, a valve connecting the first reservoir to the source of liquid, a calibrated tube upwardly extending the first reservoir, means for checking the level of the liquid contained in the tube, a syphon having a short branch which extends into the first reservoir and a long branch which extends into the collecting recipient, means for detecting the flow of liquid through the syphon and mounted in the collecting recipient and means connecting the liquid flow detecting means and the means checking the level of the liquid in the tube to the valve for opening the valve automatically when, in the absence of flow through the syphon, the liquid in the tube descends to a level lower than a set level; a stirrer in the recipient, a second reservoir containing a supply of powder; a device for metering the powder from the second reservoir; control means for controlling the metering device; and a connecting device connecting the control means to the valve, the connecting device being operative to preclude the passage of the valve from a closing position to an opening position thereof during the operation of the powder metering device.

8. A machine as claimed in claim 7, wherein the powder metering device comprises a spiral conveyor and a drive device drivingly connected to the conveyor and imparting to the conveyor an adjustable given number of rotations.

9. A machine as claimed in claim 7 or 8, comprising at least one other device for metering another product.

10. A machine as claimed in claim 8, wherein the second reservoir is a downwardly divergent container having a peripheral annular inner groove in the bottom of the container and the powder metering device comprises a flexible screw mounted in the peripheral annular inner groove, and an outlet spout which is tangent to the groove.

11. A machine as claimed in claim 10, wherein the spout is placed below the screw and a spiral conveyor is disposed in the spout, apertures being provided in the bottom of the groove for putting the groove in communication with the spout.

12. A machine as claimed in claim 10, comprising a scraper having two semi-circular blades rotatably mounted inside the flexible annular screw.

* * * * *